United States Patent
Pillai et al.

(10) Patent No.: US 7,337,289 B2
(45) Date of Patent: Feb. 26, 2008

(54) METHOD AND APPARATUS FOR COMPUTING FILE STORAGE ELEMENTS FOR BACKUP AND RESTORE

(75) Inventors: Ananthan Pillai, East Norwood, MA (US); Madhav Mutalik, Southborough, MA (US); Cara Garber, Franklin, MA (US); Ajay Shekhar, Medway, MA (US)

(73) Assignee: EMC Corporation, Hopkinton, MA (US)

( * ) Notice: Subject to any disclaimer, the term of this patent is extended or adjusted under 35 U.S.C. 154(b) by 288 days.

(21) Appl. No.: 11/143,272

(22) Filed: Jun. 2, 2005

(65) Prior Publication Data

US 2005/0235122 A1  Oct. 20, 2005

Related U.S. Application Data (63) Continuation of application No. 09/822,709, filed on Mar. 30, 2001, now Pat. No. 6,912,630.

(51) Int. Cl.
*G06F 12/00* (2006.01)
*G06F 17/30* (2006.01)
*G06F 11/00* (2006.01)

(52) U.S. Cl. .................... 711/162; 711/161; 707/205; 714/6; 714/7

(58) Field of Classification Search ............... None
See application file for complete search history.

(56) References Cited

U.S. PATENT DOCUMENTS

| | | | |
|---|---|---|---|
| 5,819,297 | A | 10/1998 | Mutalik |
| 5,890,165 | A | 3/1999 | Boudrie et al. |
| 6,029,166 | A | 2/2000 | Mutalik et al. |
| 6,141,773 | A | 10/2000 | St Pierre et al. |
| 6,161,111 | A | 12/2000 | Mutalik et al. |
| 6,269,381 | B1 | 7/2001 | St Pierre et al. |
| 6,360,330 | B1 | 3/2002 | Mutalik et al. |
| 6,446,175 | B1 | 9/2002 | West et al. |
| 6,553,387 | B1 | 4/2003 | Cabrera et al. |
| 6,578,121 | B1 | 6/2003 | Schutzman |
| 6,714,952 | B2 | 3/2004 | Dunham et al. |

*Primary Examiner*—Reginald Bragdon
*Assistant Examiner*—Mehdi Namazi
(74) *Attorney, Agent, or Firm*—Daly, Crowley, Mofford & Durkee, LLP (57) ABSTRACT

A method and apparatus for method for transferring files between a primary storage system and a backup and restore system is described. The system generates collapsed extents which are used to specify data to be backed up to a backup and restore system. The backup and restore system backs up data based on the collapsed extents but records all extents included in the collapsed extents to enable the system to facilitate restoration of the data at a later point in time.

15 Claims, 8 Drawing Sheets

METHOD AND APPARATUS FOR COMPUTING FILE STORAGE ELEMENTS FOR BACKUP AND RESTORE

CROSS-REFERENCE TO RELATED APPLICATIONS

This application is a continuation of U.S. patent application Ser. No 09/822,709 filed Mar. 30, 2001 (now issued as U.S. Pat. No. 6,912,630).

STATEMENTS REGARDING FEDERALLY SPONSORED RESEARCH

Not applicable.

FIELD OF THE INVENTION

This invention relates generally to backup storage systems and more particularly to a system and method for efficiently transferring information between a primary processing system and a backup and restore system.

BACKGROUND OF THE INVENTION

As is known in the art, there exists a variety of systems for backing up computer data that can be subsequently restored. In general, such backup and restore systems are used to backup data from a plurality of computers or clients connected to one or more networks. A user, such as a system administrator, can restore selected portions of the previously backed up data to a desired client computer. In this manner, the loss of data which can be contained in large databases can be reduced and in some instances, even prevented.

In some systems, data used by one or more clients is first stored on a primary storage system such as a Symmetrix storage system provided by EMC Corporation of Hopkinton, Mass. In such systems, the purpose of a backup and restore system such as a Fastrax storage system also provided by EMC Corporation of Hopkinton, Mass. is to backup to long term storage devices the data that belongs to the client but which is stored on the primary storage system. For example, data stored on the Symmetrix system (i.e. the primary storage system) is backed up through the Fastrax system (i.e. the backup storage system) to long term storage coupled to or provided as part of the Fastrax system. The long term storage may be provided, for example, as disk drives, tape storage or any other storage mechanism.

The data must be backed up in manner which allows the data to be subsequently restored from the long term storage (e.g. the tape drives) to the primary storage system (e.g. the Symmetrix system) and the client. The backup and restore system is thus sometimes considered to include long term storage together with a system for placing data into the long term storage device and recovering the data from the long term storage device.

To perform a backup, the client copies data from the primary storage system to the backup and restore system. Similarly, to perform a restore, the backup and restore system copies data back to the primary storage device. Thus, during backup and restore operations actual data files are communicated between a host (e.g. the client and or primary storage system) to the backup and restore system.

Primary storage systems such as the Symmetrix system typically comprise a plurality of disks (i.e. an array of disks) and the data is stored on sections of the disks. The sections of the disks are referred to as "extents" (i.e. an extent corresponds to a small portion or piece of a disk). The data in the primary storage system can thus be typically specified in the form of extents.

To implement a backup operation through the backup and restore system, the client or the primary storage system must specify to the backup and restore system the particular data which should be backed up. Typically, only a portion of the data on the primary storage system (rather than all of the data stored on the primary storage system) must be backed up at any one time. Thus, to specify to the data which should be backed up, the client or primary storage system provides a list of extents to the backup and restore system.

The extents can lie across many disks of the disk array (i.e. the extents are typically scattered around the disks) and the number of extents which must be specified can get very large. The number of extents which backup and restore systems can receive, however, is limited. That is, the backup and restore systems (e.g. the Fastrax system) limit the number of extents which a client or primary storage system (e.g. the Symmetrix system) can specify during any single backup operation. In some cases, however, the number of extents which must be specified by a host (e.g. the client or the primary storage system) to the backup and restore system can be very large and sometimes can even exceed the number of extents which the backup and restore system can handle.

For example, assume the backup and restore system can handle only 1000 extents at one time. The prior art approach to solving this problem is to send no more than 1000 extents at a time to the backup system. When the first 1000 extents are processed the next 1000 are sent and so on until all extents have been processed. This solution is relatively time consuming and also consumes a relatively large amount of system resources since extents are continuously transferred between the host and the backup and restore system. If the number of extents which the backup and restore system can handle is exceeded, the system fails to complete, or in some case to even perform, the backup operation.

This problem is exacerbated somewhat when the primary storage system stores data with a so-called striping technique. In a striping technique, data from a single file is stored such that the data is spread across multiple disks in a predetermined pattern. This results in a storage pattern in which data is stored on disks using a relatively large number of extents, each of which is relatively small in size.

Another problem is that the host must collect and transmit (or otherwise provide) the information to the backup and restore system. In a worst case scenario the host transmits information on each extent separately. If a relatively large number of extents are specified (but within the limits of the backup and restore system) this process is relatively time consuming and also consumes resources which would otherwise be available for data processing tasks because of the large number of extents. Also, once all of the data to be backed up had been specified to the backup and restore system, a relatively large amount of time is required to transfer the data from the primary storage system to the backup and restore system.

A further problem is that when the number of extents is large, a large amount of data must be used to represent the extents being backed up. Thus, a relatively large amount of memory resources are required.

Still another problem arises when it is time for the system to perform a restore operation. It should be appreciated that during a backup it is only necessary to instruct the backup and restore system to take the extent as a backup. In a restore operation, however, it is necessary to specify how the data was backed up and how it should be restored. Thus, the host must specify the mapping used during the backup process (i.e. the backup data which is now on tape) and must also specify how to restore the data using a new mapping.

It would, therefore, be desirable to provide a technique for efficiently representing data so that it can be efficiently and rapidly communicated between a host and a backup and restore system during backup and restore operations.

SUMMARY OF THE INVENTION

In accordance with the present invention, it has been recognized that many extents make up a block of data and that certain patterns often show up when examining extents in a primary storage system (e.g. a Symmetrix system). One pattern which often shows up is the striping pattern. When a striping pattern is recognized, then on each individual disk in the primary storage system, it is possible to treat each extent which is part of the stripe pattern on that disk as one large extent referred to herein as a collapsed extent. Thus, although each of the individual extents in the stripe pattern are recognized, all the data on that disk and included in that portion of the stripe pattern can be included when specifying extents to a backup and restore system (e.g. a Fastrax system).

In accordance with a further aspect of the present invention, a technique for computing file storage elements for a backup operation includes defining a logical backup object, specifying one or more collapsed extents, starting data movement between a host and a backup and restore system and recording details of the specified extents. With this particular arrangement, a technique for specifying relatively few extents to a backup and restore system while allowing a relatively large number of extents to be backed up and subsequently restored is provided. By specifying collapsed extents rather than actual extents, the number of extents provided to the backup and restore system for the same amount of data is less than the number of extents required using the prior art approach. Thus, more data can be backed up without reaching or exceeding the extent limit of the backup and restore system. Also, by recording the details of the collapsed extents, the data can be properly restored in a restore operation.

In accordance with a still further aspect of the present invention, a backup and restore system comprises a processor for defining a logical backup object, a collapsed extent processor for specifying collapsed extents, means for starting data movement between a host and the backup and restore system and an extent recording processor for recording details of collapsed extents. With this particular arrangement, a system which can backup and restore data while specifying relatively few extents is provided. The collapsed extents processor produces one or more collapsed extents each of which specify an amount of data which would be specified by multiple extents using conventional techniques. Each collapsed extent is based on a plurality of actual extents which define a file or block of data. By generating collapsed extents rather than actual extents, the number of extents which must be specified to a backup and restore system is less than the number of extents which must be specified using the prior art approach for the same amount of data. Thus, more data can be backed up without reaching or exceeding the extent limit of the backup and restore system. The extent processor records details of the collapsed extents provided to the backup and restore system to enable the system to properly restore data to a primary storage device and/or client.

By using collapsed extents, the system allows backup operations to be performed by specifying a relatively small number of extents which can define a relatively large amount of data. Thus when the backup and restore system backs up data, it need not access disks of the primary storage system and retrieve a relatively small portion of data and then transfer that data to the backup system. Rather, the backup and restore system can operate on relatively large portions of data stored on the primary storage system.

The technique of the present invention also provides for recording the smaller extents which make up the collapsed extent. When backing up the data, a record of the smaller extents which make up the collapsed extents is maintained. This information is recorded as part of the backup process. Thus, even though collapsed extents may have been specified, the backup and restore system internally records each of the relatively small extents which make up the collapsed extents which define relatively large amounts of data. The details of the collapsed extents are needed during a restore operation and recording the relatively small extents which comprise the collapsed extents facilitates restoration of the data. In order to record the relatively small extents, it is necessary to record the manner in which the data was striped.

It should thus be appreciated that while the collapsed extents are specified to the backup and restore system (e.g. the Fastrax system) what is actually recorded by the backup and restore system is every extent (i.e. collapsed extents are specified to the backup and restore system but every extent included in the specified collapsed extent is recorded). Without recording the details of the collapsed extents, the backup operation could be successfully complete but there would be a relatively large number of restrictions which would be imposed when it came time to restore the data. For example, the restore may only be allowed if the same kind of striping was found at restore time as existed during the backup operation. That is, without cataloging the individual extents it would be possible to perform a relatively efficient backup operation but the restore operation could only take place if the location to which the data being restored had the same number of stripes that existed at backup.

In accordance with a yet further aspect of the present invention, a technique for restoring extents from a backup and restore system to a host includes recognizing a pattern of extents in which data is stored and specifying the data by specifying pairs of extents which make up the data. With this particular arrangement, a technique for restoring data by specifying pairs of extents is provided. By specifying pairs of extents, the representations are compact. This leads to a relatively rapid restoration process which requires fewer resources than prior art restoration techniques.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before proceeding with a description of the present invention and the techniques associated therewith, some introductory concepts and terminology are explained.

An extent is a contiguous piece of data on a disk (i.e. a physical device) identified by a disk name, a starting offset and a length. These three parameters taken together uniquely identify an extent. As used herein, the term "extent" refers to the basic unit used to specify data.

As will be explained further below, in accordance with the present invention, multiple extents can sometimes be specified as though they are a single extent. The term "collapsed extent" is used herein to refer to any extent which itself is made up of more than one extent.

Reference is also sometimes made herein to storage systems (e.g. primary storage systems) having a disk array with a certain number of disks (e.g. two disks). It should be understood that any particular values mentioned herein are only exemplary and are not intended in any way to limit the scope of the invention. It should also be understood that the present invention applies to systems having any number of disks. The particular number of disks in a storage system in any particular application are chosen in accordance with a variety of factors particular to each application.

Reference is also sometimes made herein to particular primary storage systems and backup and restore systems such as the Symmetrix and Calyso systems available from EMC Corporation of Hopkinton, It should be understood that such references are not intended to be limiting but are merely made for ease of explanation and to facilitate the understanding of particular concepts and techniques described herein. It should thus be understood that the concepts and techniques described herein apply equally well to a broad range of primary storage systems and backup and restore systems.

Figure 1:
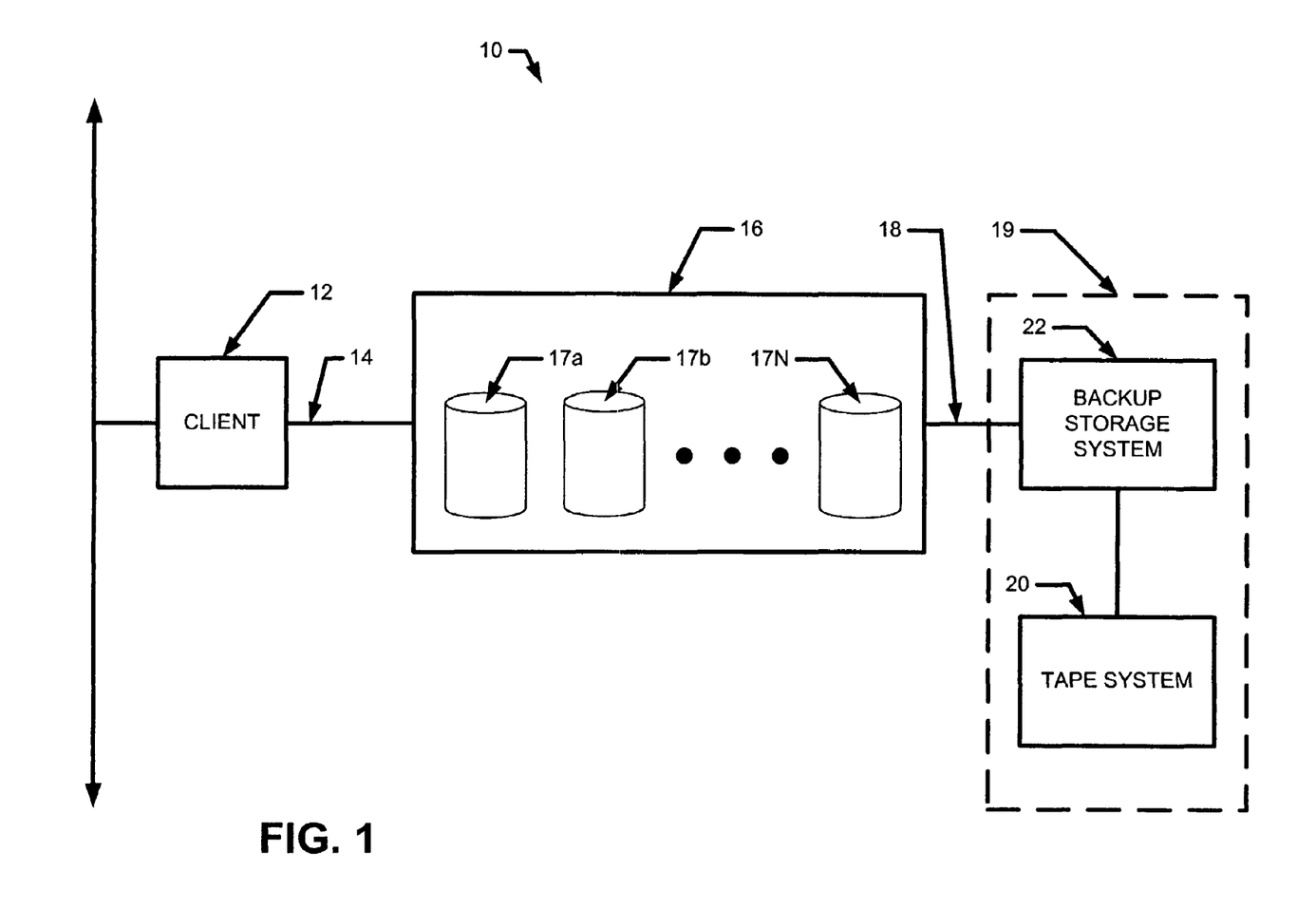
FIG. 1 is a block diagram of a backup and restore system.

Referring now to FIG. 1, a processing system 10 includes a computer or client 12 coupled via a path 14 to a primary storage system 16. Client 12 performs its operations using data stored in storage system 16. The storage system 16 is comprised of an array of disks 17a-17N. A connection 18 couples the storage device 16 to a backup and restore system 19.

The backup and restore system 19 includes a long term storage device 20 and a system 22 for placing data into the long term storage device 20 and recovering the data from the long term storage device 20. The storage device 20 is shown as tape storage system in FIG. 1. Those of ordinary skill in the art will appreciate, of course, that storage system 20 may alternatively include or be provided from disk drives or any other storage mechanism.

The client 12 may be any conventional computing system, such as a network client available from Sun Microsystems, and running the Solaris operating system (a version of Unix), an HP client running HP-UX (a Hewlett-Packard client, running a Hewlett-Packard version of the Unix operating system) or an IBM client running the AIX operating system (an IBM version of Unix) or any other system with an associated operating system such as the WINDOWS NT operating system. The storage system 16 may be any conventional storage system, including a Symmetrix storage system, as described above.

Those of ordinary skill in the art will appreciate that system 10 may include other components not shown in FIG. 1. For example, the system may also include a backup server which functions to monitor backup procedures and operations. Also, the client 12 may be coupled to many other devices not shown in FIG. 1.

Primary storage system 16 includes the plurality of disks 17a-17n so that the system 16 may, inter alia, provide redundant storage capacity. A variety of ways of storing data onto the disks 17a-17N in a manner which permits data stored on a disk to be recovered have been developed. A number of such methods are generally described in the RAIDbook, A Source Book For Disk Array Technology, published by the RAID Advisory Board, St. Peter, Minn. (5th Ed, February, 1996). These systems include "RAID" storage systems. RAID stands for Redundant Array of Independent Disks.

In the system shown in FIG. 1, the primary storage system 16 may be a system such as generally described in EMC Data Manager: Symmetrix Connect User Guide, PN 200-113-591, Rev. C, December 1997, available from EMC Corporation of Hopkinton, Mass.

The connection 18 may be a high speed data channel, such as a SCSI cable or one or more fiber-channel cables. In this system, a user may be permitted to backup data from the primary storage system 16 over the connection 18 to the backup and restore system 19.

In general overview, client 12 determines which data should be backed up and represents the data utilizing so-called extents. It should be appreciated, of course that not every extent is transferred from the primary storage device 16 to the backup storage device 19. Thus there remains the problem of specifying the particular extents to be backed up. Typically the client 12 (or the primary storage device 16 or some other processor) provides the backup and restore system 19 with a list of extents. Each extent is specified by a disk name, a starting offset and a length. The host provides an ordered list of extents using this format.

The particular manner in which the extents to be backed up are specified to the system 19 will be described in detail below in conjunction with FIG. 2. Suffice it here to say that the client 12 determines the data which should be backed up and specifies one or more collapsed extents to the backup and restore system 19. While the data specified by the collapsed extents is being backed up from system 16 to system 19, the system 19 records the details of the specified collapsed extents. In this manner, relatively few extents are specified to the backup and restore system 19 but a relatively large number amount of data is transferred to the backup and restore system 19.

By specifying collapsed extents rather than actual extents to the backup and restore system 19, the number of extents specified to the backup and restore system 19 is less than the number of extents specified using the prior art approach for the same amount of data. Thus, more data can be backed up without reaching or exceeding the extent limit of the backup and restore system 19.

Also, by recording the details of the collapsed extents, the data can be properly restored in a restore operation.

Figure 1A:
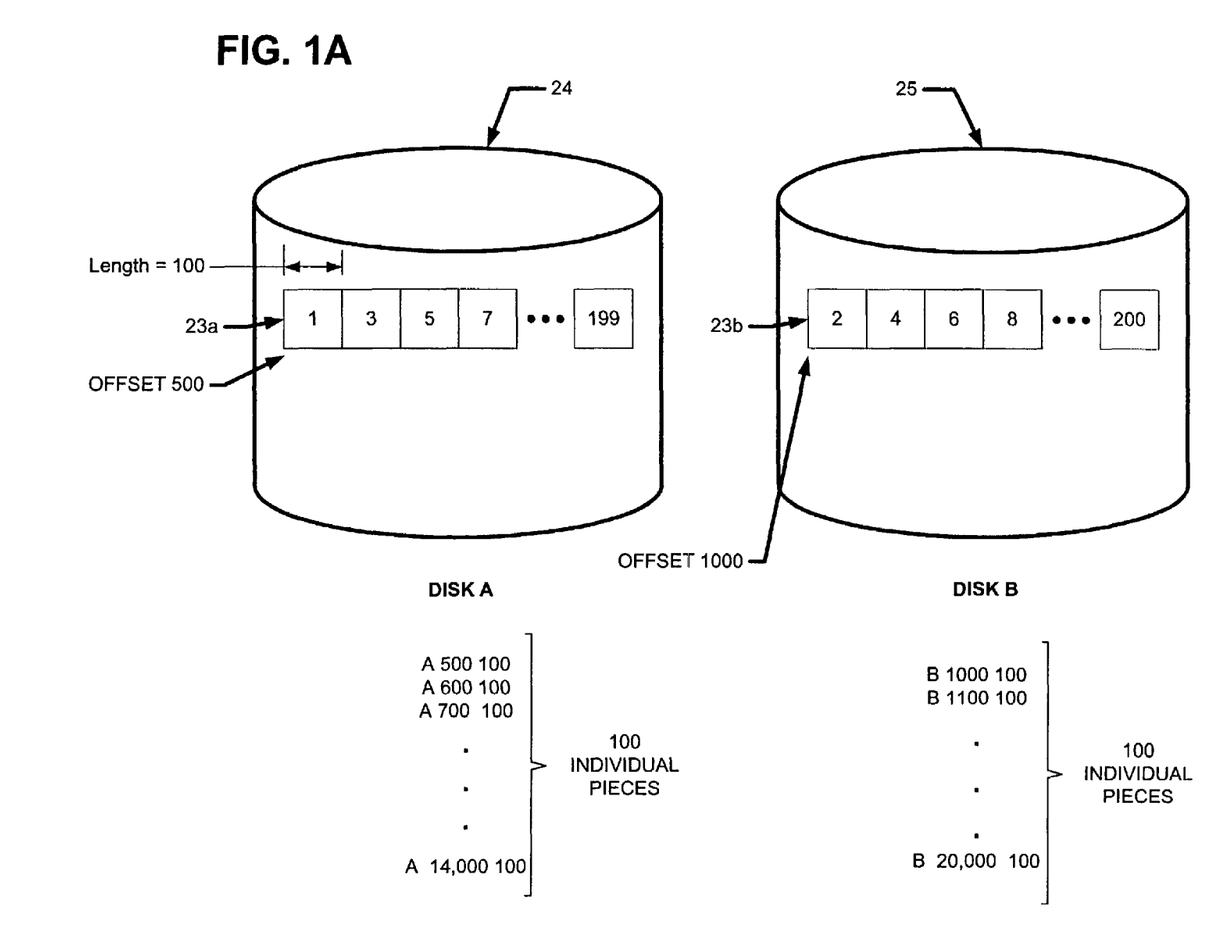
FIG. 1A is a diagrammatical view of extents striped on a pair of disks.

Referring briefly to FIG. 1A, data is shown stored in a conventional stripe pattern where the striping is done across two disks 24, 25 denoted "Disk A", and "Disk B" respectively. It should be appreciated that in practice, the stripe technique is often utilized with more than two disks (i.e. the striping takes place across a relatively large number of disks) and that two disks are used in this example for ease of explanation. The stripe pattern 23 is made up of a first stripe 23*a* on Disk A and a second pattern 23*b* on Disk B. Stripe 23 is made of 200 extents (100 in stripe 23*a* and 100 on stripe 23*b*) It should be appreciated that the numbering of the extents (e.g. numbers 1, 3, 5, 7, . . . 199 in extent 23*a* and 2, 4, 6, 8, . . . 200 in extent 23*b*).

In a worst case scenario, to specify the extents to the backup and restore system 19 using conventional approaches, each extent must be individually specified to the system 19. Thus, in the case where 200 extents exist, each of the individual 200 extents must be specified to the backup and restore system 19. The extent list for Disk A and Disk B are shown in FIG. 1A.

As indicated in FIG. 1A, 200 total extents must be specified similarly, in the case where N+1 extents exist, one must specify each of the individual N+1 extents to the backup and restore system 19. Thus in the conventional prior art approach to specifying data to be backed up, one generates a logical backup object (LBO) and defines the LBO in terms of extents and then records the extents.

When it is time to restore data from the backup and restore system to the host, the host must define that the extents which have been backed up now have to go back to disk space specified by the host. Generally, this is not the same disk space from which the extent was moved during the backup process. That is, the host might specify that the original extent (which came from one contiguous disk space) must now go back into two different places on the disk. In this case data is restored to a different place from where the data was backed up. It is thus necessary to describe the data to be restored and where it goes.

FIGS. 2, 3, 5 and 6 are a series of flow diagrams showing the processing performed by portions of system 10 (FIG. 1) to backup and restore data. The rectangular elements (typified by element 26 in FIG. 2), are herein denoted "processing blocks" and represent computer software instructions or groups of instructions. The diamond shaped elements (typified by element 38 in FIG. 2), are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required to perform backup and restore operations in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 2:
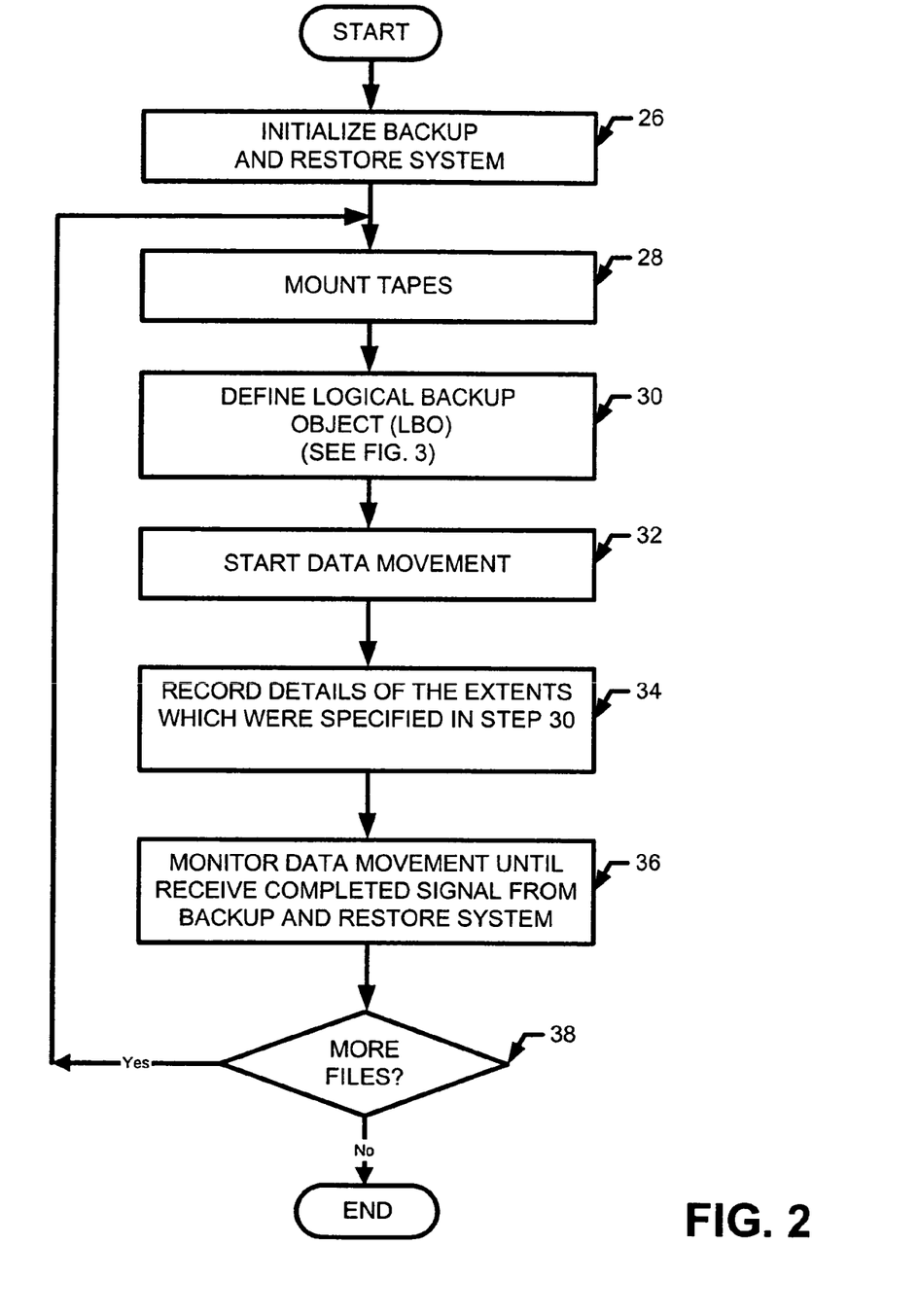
FIG. 2 is a flow diagram of the backup process.

Turning now to FIG. 2, the process of backing up data begins by initializing the backup and restore system as shown in step 26. Next as shown in step 28, tapes (or other storage devices) are mounted in the backup system (e.g. tape system 20 in FIG. 1). A logical backup object (LBO) is then defined as shown in step 30. A process for defining an LBO will be described in more detail below in conjunction with FIGS. 3 and 4. Generally, however, this process determines how to represent data to be backup using collapsed extents.

Processing then proceeds to step 32 in which data movement from a primary storage system (e.g. system 16 in FIG. 1) to a backup and restore system (e.g. system 19 in FIG. 1) is started. Next, the details of the collapsed extents which were specified in step 30 are recorded as shown in step 34. It should be appreciated that step 34 can be performed before or after step 32. Generally, the information can be conveyed by transmitting metadata information (i.e. the LBO metadata information) to the backup and restore system.

Next, as shown in step 36, data movement is monitored until the Fastrax system provides an indication that the data movement is complete.

Decision block 38 determines whether more files remain to be processed. If more files should be processed then, processing returns to step 28 and steps 28-36 are repeated until all of the data is moved. If no more files remain to be processed then processing ends.

Figure 3:
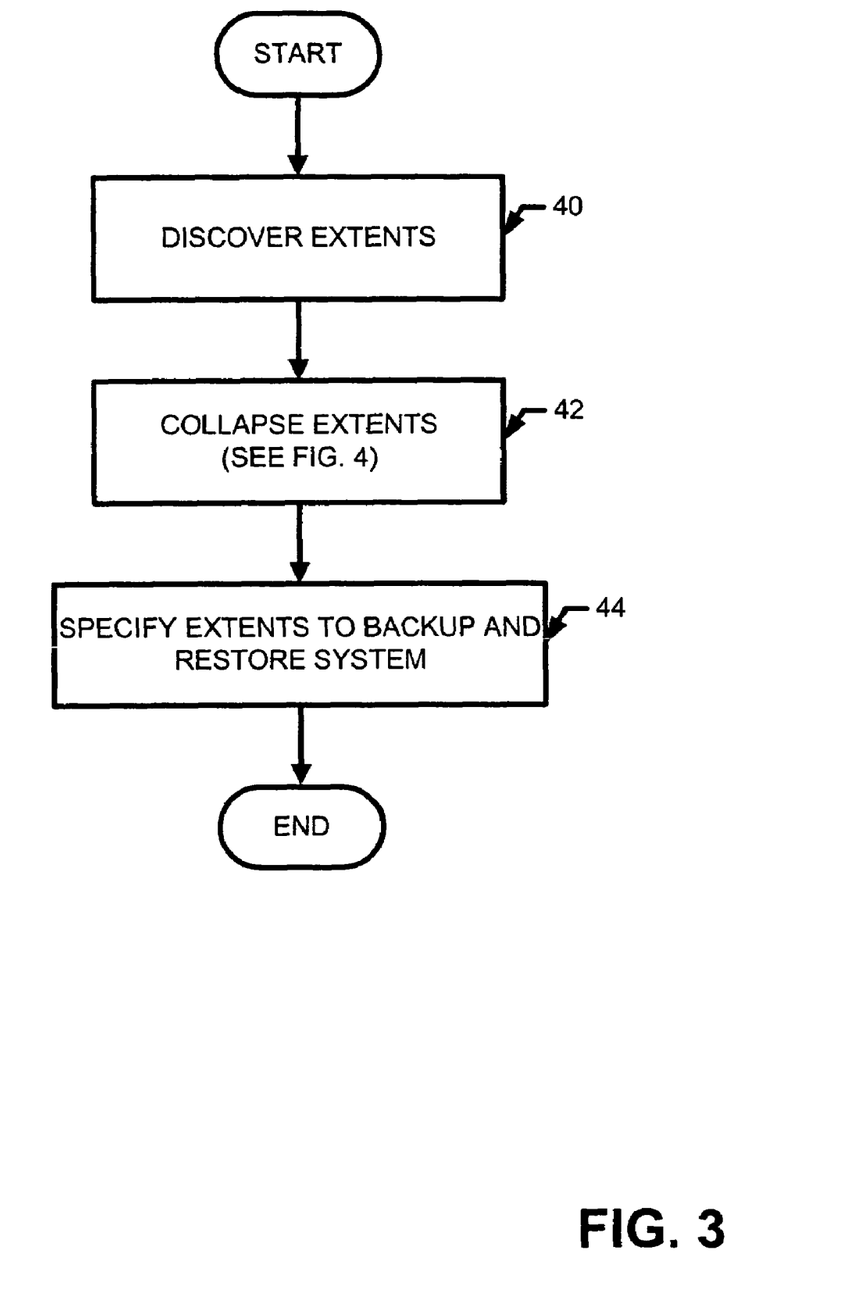
FIG. 3 is a flow diagram of a technique for specifying collapsed extents to a backup and restore system.

Referring now to FIG. 3, the steps to define an LBO are shown. Processing begins by discovering the location of the extents to be backed up as shown in step 40 and then appropriately identifying any pattern in the extents to combine or collapse the extents as shown in step 42. It should also be appreciated that step 42 is important to providing an efficient representation of the extents.

The collapsing step makes the LBO definition work correctly in situations where there are a lot of extents or faster in a situation where the extents are relatively small and spread around multiple disks.

One particular technique for collapsing the extents as shown in step 42 is described in detail below in conjunction with FIG. 4. Generally, however, to collapse an extent it is first necessary to recognize a pattern in the stored data. The pattern is recognized by getting the logical volume manager mapping from the file mapping. In one approach described in U.S. patent application Ser. No. 09/777,977 now U.S. Pat. No. 6,578,121), filed on Feb. 5, 2001 and having named inventor Neil F. Schutzrnan and assigned to the assignee of the present invention, all of the extents are found and it is then determined whether there is a pattern to the extents. This approach allows the data to be represented compactly. After the patterns are recognized, the collapsed extents can be generated.

There are at least two techniques to obtain the extents. A first technique is to have the system provide a list of all extents. Then each extent can be examined in relation to other extents. For example, it could be recognized that extents 1 and 3 are on the same disk and are adjacent to each other and that extent 5 is on the same disk as extent 3 and is adjacent to extent 3. In this way one could recognize a stripe pattern for example.

A second technique is to have the system provide a layout of the logical volumes. Such a request would then identify, for example, that the system had two striped volumes. One could then have the system to provide a layout of the files within the logical volumes. This information would reveal patterns.

Once the collapsed extents have been provided, processing proceeds to step 44 in which the collapsed extents are specified to the backup and restore system (e.g. system 19 in FIG. 1). It should be appreciated that steps 40 and 44 are steps which those of ordinary skill in the art would recognize as being needed to define the LBO. It should be appreciated that once the extents are specified to the backup and restore system, the backup and restore system reads the extents from the disks of the primary storage system (e.g. system 16 in FIG. 1) and stores the extents on the storage system 20.

Figure 4:
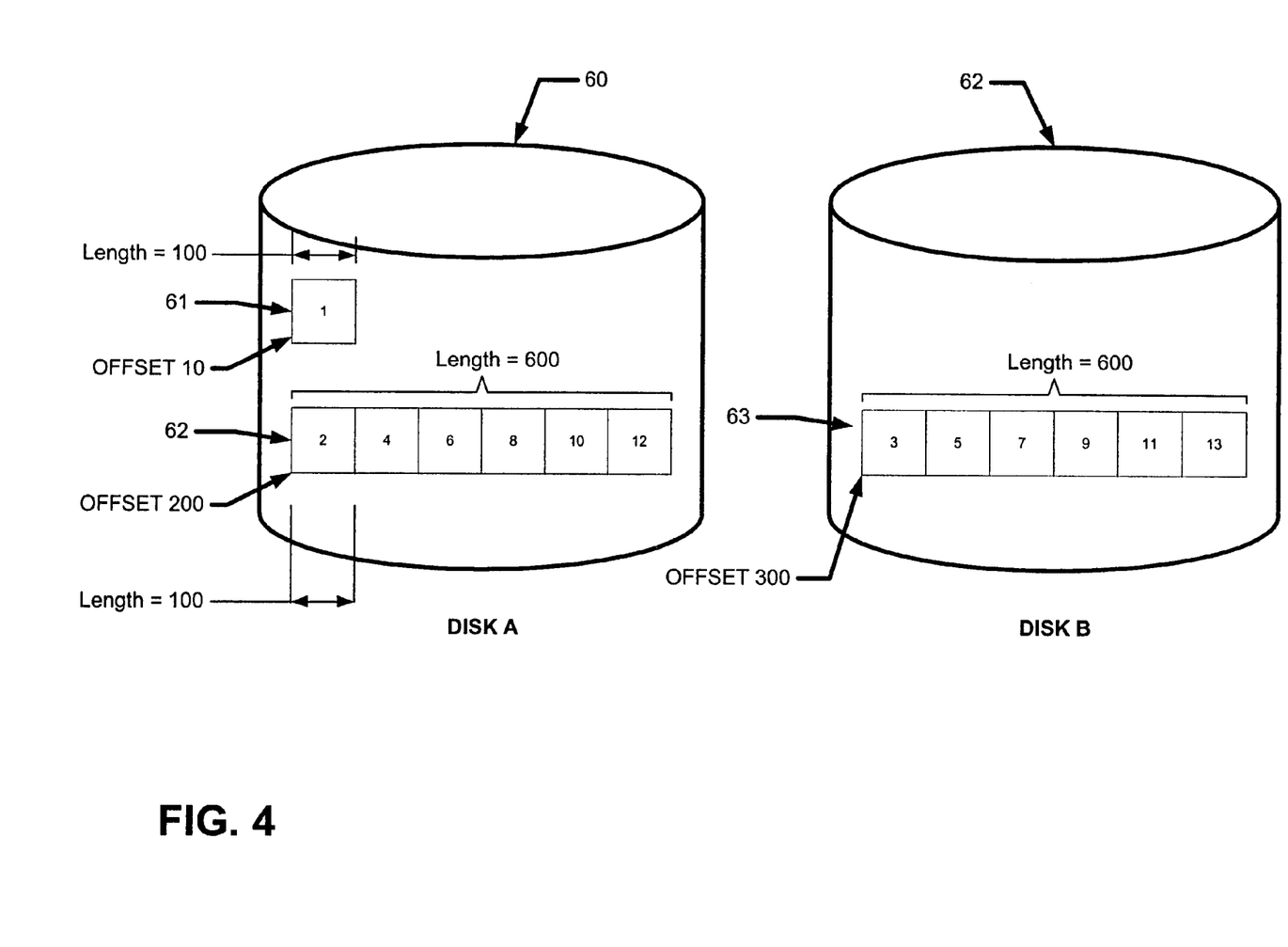
FIG. 4 is a series of diagrammatical views of extents striped on a pair of disks.

Referring now to FIG. 4, assume that an object being backed up looks as shown in FIG. 4. Thus the file is made up of a first extent 61 and two striped extents 62, 63. The conventional approach to specify the object/file to a backup and restore system is to list all of the extents. This means that 13 extents would have to be specified as shown in Table I below:

TABLE I

| Disk | Offset | Length |
|------|--------|--------|
| A | 10 | 100 |
| B | 300 | 100 |
| A | 200 | 100 |
| B | 400 | 100 |
| A | 300 | 100 |
| B | 500 | 100 |
| A | 400 | 100 |
| B | 600 | 100 |
| A | 500 | 100 |
| B | 700 | 100 |
| A | 600 | 100 |
| B | 800 | 100 |
| A | 700 | 100 |

It should be appreciated that the number of entries in the table grows very large when the striped file is made up of a large number of extents (e.g. thousands or hundreds of thousands of extents) rather than the 12 extents (i.e. stripes 62, 63 each comprise extents on Disk A and Disk B) as shown in the example of FIG. 4.

Using the technique of the present invention, however, only three extents would need to be specified. This is done by specifying collapsed extents as shown in Table II below:

TABLE II

| Disk | Offset | Length |
|------|--------|--------|
| A | 10 | 100 |
| A | 200 | 600 |
| B | 300 | 600 |

Figure 5:
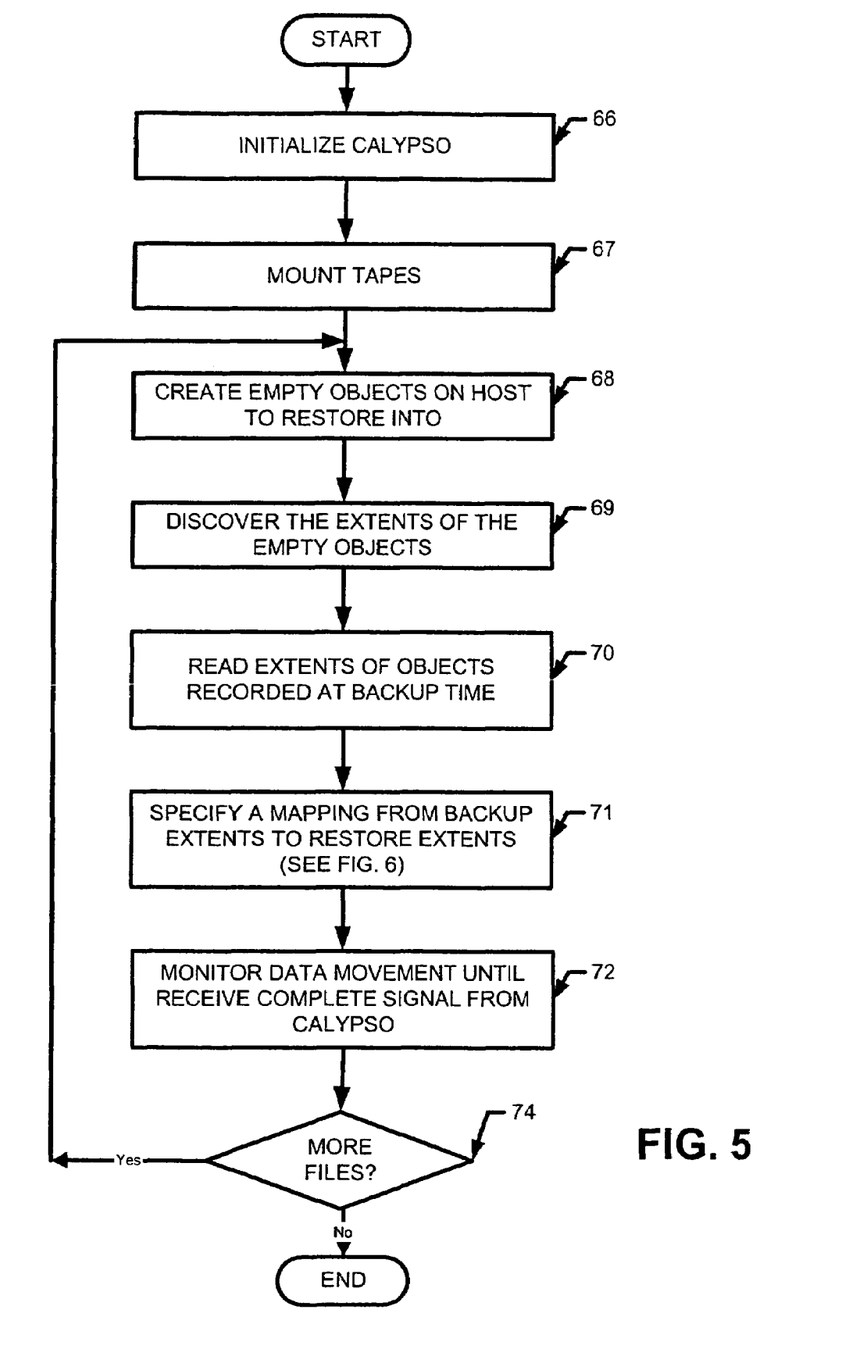
FIG. 5 is a flow diagram of the restore process.

It should be appreciated that the number of entries remains at three even when the file/object is made up of 200 extents rather than 12 extents as shown in the example of FIG. 5.

For example, assume each of the stripes 62, 63 were made up of 100 extents each rather than 6 extents each. Then in this case the length of stripes 62, 63 would be 10,000. The 10,000 figure is computed by multiplying the number of extents on each disk by the block length. In the case where the file is striped across disk A and disk B, 100 blocks appear on Disk A and 100 blocks appear on Disk B. Thus, to specify the length on each disk, the length is computed as 100 extents×100 units per block which totals 10,000. The data can still be fully specified with only 3 entries (vs. 201 entries required in the conventional approach), however, by changing the lengths in table II from 600 to 10,000.

It should be noted that when using the technique of the present invention, each of the extents is recorded but only the entries shown in Table II are specified to the backup and restore system. It is important to note that the number of entries was reduced to three from thirteen. It is also important to note that the particular order of the entries is not critical as long as the order is tracked in a manner which allows the backup and restore operations to be performed without confusion.

Referring now to FIG. 5, when a command is issued to restore a database, the restore operation begins by initializing the backup and restore system and then mounting any necessary tapes as shown in steps 66, 67.

Space for all database files is allocated by generating empty objects on the host as shown in step 68. These objects are the objects into which the data will be restored. All of the extents for the entire database (i.e. the extents of the empty objects generated in step 68) are then discovered as shown in step 69. Next, as shown in step 70, all of the extents of objects recorded at backup time are read and then all of the extents to be restored are specified to the backup and restore system as shown in step 71. The particular manner in which this process is performed is described in more detail below in conjunction with FIG. 6. Data movement is then monitored until a complete signal is received from the backup and restore system as shown in step 72.

It should be noted that normally when a backup operation is performed, there are many objects. Thus, it should be appreciated that steps 66-71 are typically performed for many objects.

Decision block 74 implements a loop in which steps 66-72 are repeated until there is no more data to process. Thus, the loop implemented by step 74 would be used only if the user wants to restore another file or database. Otherwise processing ends.

Figure 6:
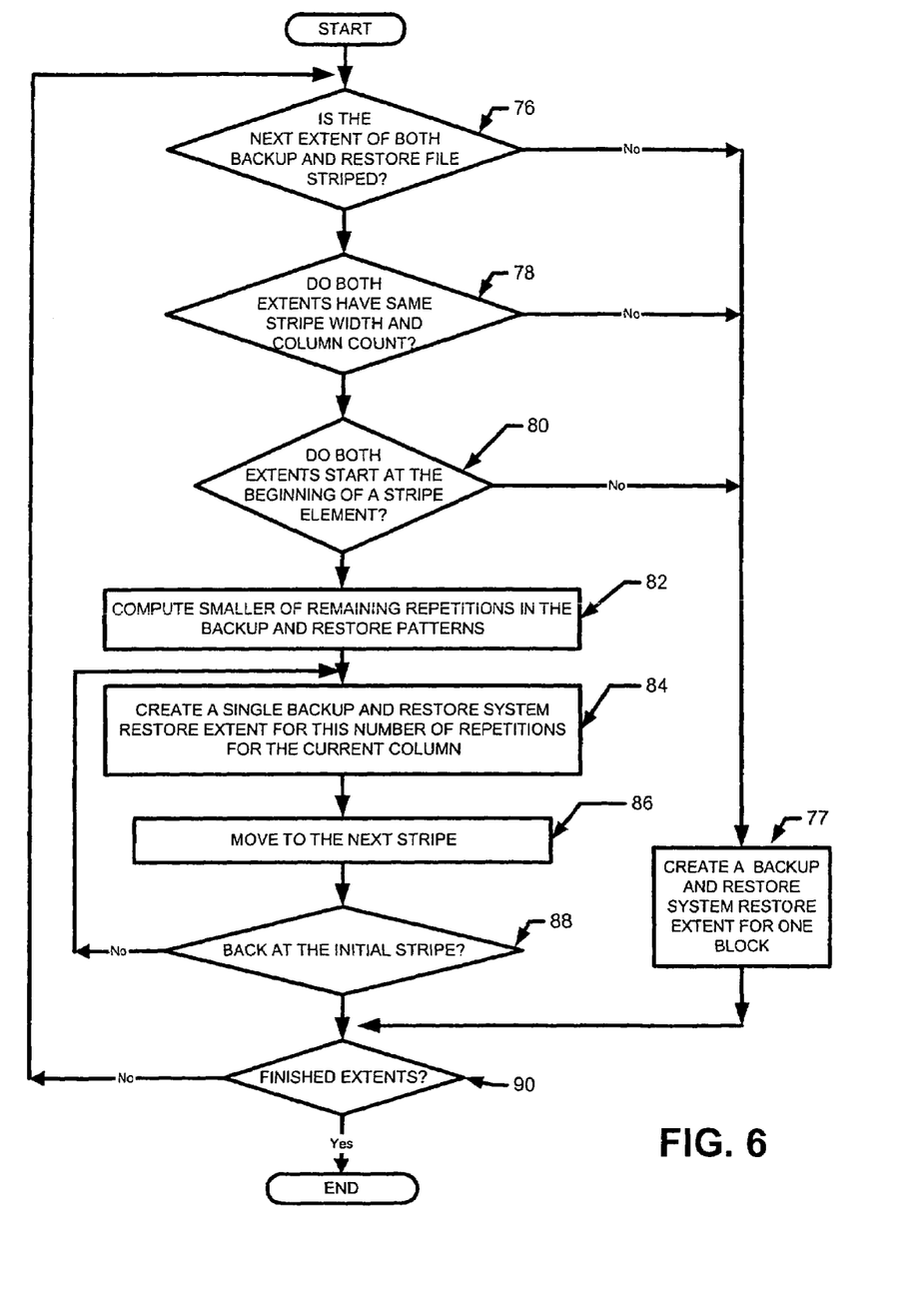
FIG. 6 is a flow diagram of the process for mapping backup extents to restore extents.

Turning now to FIG. 6, the process for specifying extents to be restored begins in decision block 76 in which a decision is made as to whether the next extent of both the backup and restore files is striped. If the next extent of both the backup and restore files is not striped, then processing flows to step 77 in which a restore extent for one block is created on the backup and restore system. Processing then proceeds to decision block 90 in which decision is made as to whether any extents remain to be processed. If no extents remain to be processed, then processing ends. Otherwise, processing returns to decision block 76. Thus, decision block 90 implements a loop in which repeats until all extents are processed.

If a decision is made in decision block 76 that the next extent of both the backup and restore files is striped, then processing flows to decision block 76 in which decision is made as to whether both extents have the same stripe width and column count. If both extents do not have the same stripe width and column count, then processing flows to steps 77 and 90 as discussed above.

If both extents have the same stripe width and column count, then processing flows to step 80 in which decision is made as to whether both extents start at the beginning of a stripe element. If both extents do not start at the beginning of a stripe element, then processing again flows to steps 77 and 90 as discussed above. If both extents do not start at the beginning of a stripe element, then processing proceeds to block 82 in which the smaller of the remaining repetitions in the backup and restore striping patterns is computed.

Blocks 84-88 implement a loop to generate restore extents on the backup and restore system. In block 84, a single restore extent is created for the number of repetitions for the current column. In block 86, the next stripe is selected. In decision block 88, decision is made as to whether process has returned to the initial stripe. If decision is made in decision block 88 that the process has not returned to the initial stripe, then processing returns to step 84. If decision is made in decision block 88 that the process has returned to the initial stripe, then processing flows to decision block 90.

As mentioned above, decision block 90 determines whether more extents remain to be processed. If more extents should be processed then, processing returns to step 76 and steps 76-90 are repeated until all of the extents are processed. If no more extents remain to be processed, then processing ends.

Figure 7:
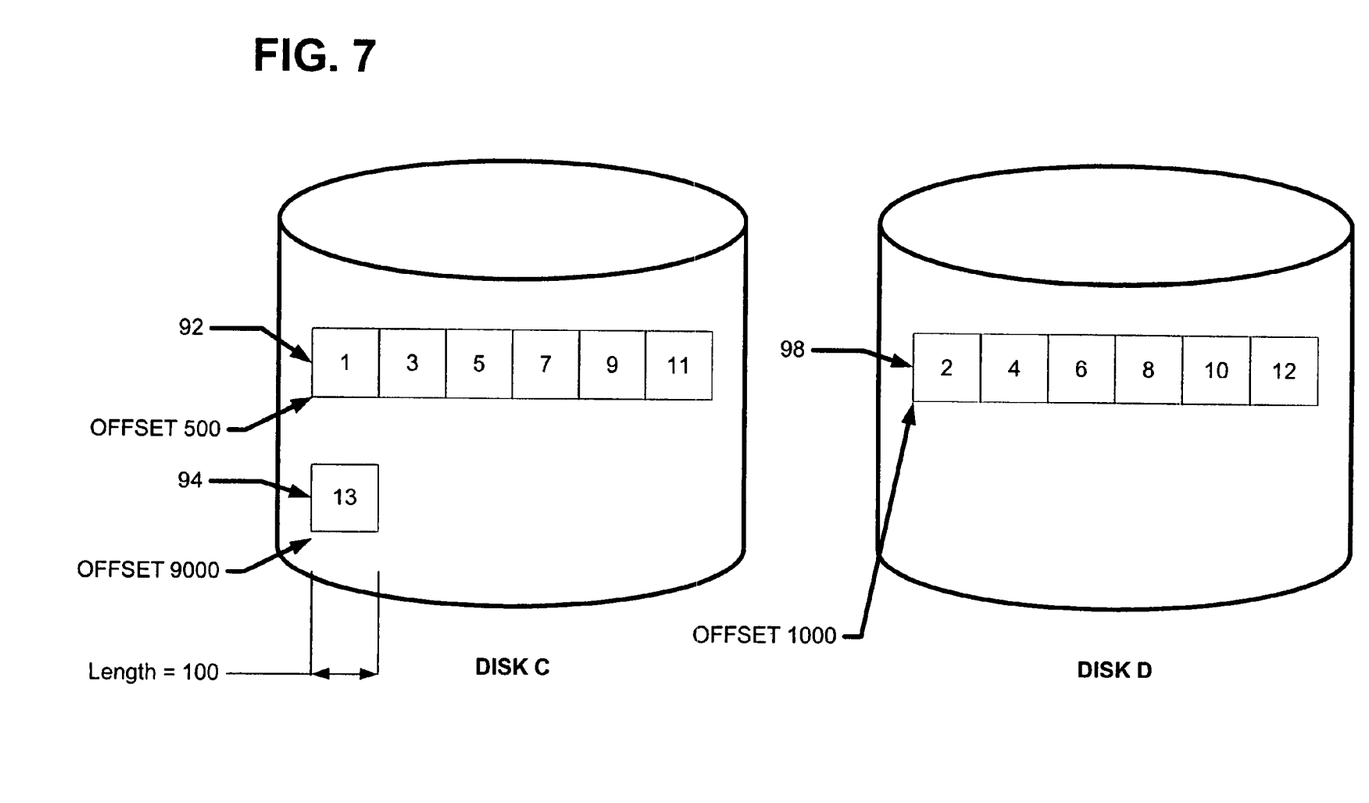
FIG. 7 is a diagrammatical view of extents striped on a pair of disks.

Referring now to FIG. 7, a block diagram illustrating restoration of the files backed up from Disks A and B in FIG. 4 to disks C and D in FIG. 7 is shown.

It should be noted that empty objects 92, 94 created on disk C have a slightly different layout than those which existed on disk A (FIG. 4) in that in the disks of FIG. 7, the striped extents appear first and the single extent appears after the striped extents. This can occur because when an empty object is created, the user has no control over where the object is created since these objects are typically created by File system (FS) and logical volume manager (LVM) software. The FS and LVM are responsible for allocating space on a disk and depending upon what else exists, the FS and LVM will find space. There is, however, no way to specify to the FS or LVM the location or characteristics of the space. Sometimes one can specify which disk but one cannot specify which part of the disk since the part of the disk one may specify may already be in use.

After the objects are created the user can query the object creation system to determine what has been created and the system will show the details. It is not possible to specify that an object be created in a specific manner but one can specify the size of the desired object and the system chooses where it wants to put the object.

After the space is allocated, a list which describes what the allocated space looks like is generated. The empty objects created are as shown in FIG. 7 and when a "discovery" (e.g. FIG. 5, step 69) was performed the information shown in Table III was what was found (i.e. there are two striped pieces 92, 98 followed by one single piece 94. Thus an empty object is first created and then a discovery process is performed to see what the objects look like.

For disks C and D in FIG. 7, these lists would look as shown in Table III below:

TABLE III

| Disk | Offset | Length |
|------|--------|--------|
| C | 500 | 100 |
| D | 1000 | 100 |
| C | 600 | 100 |
| D | 1100 | 100 |
| C | 700 | 100 |
| D | 1200 | 100 |
| C | 800 | 100 |
| D | 1300 | 100 |
| C | 900 | 100 |
| D | 1400 | 100 |
| C | 1000 | 100 |
| D | 1500 | 100 |
| C | 9000 | 100 |

Thus, the above represents the empty object which was created in step 68 FIG. 6.

The prior art approach would now be to look at all of the individual extents in the backup and map each of them to one restore extent as shown in FIG. 7. At restore time, the following information is specified to the backup and restore system: what was originally stored on Disk A, at offset 10 with a length of 100 (denoted as A, 10, 100) should now go to C, 500, 100 (i.e. the first piece of the backup file must match up with the first extent in the restore object); what was originally A, 200, 100, should now go to D, 1000, 100, etc. . . . The process continues until all of the backup files are restored. Thus the restore extent map consists of two parts (shown as two columns) as shown in Table IV below:

TABLE IV

| Backup Extents | | | Restore Extents | | |
|---|---|---|---|---|---|
| Disk | Offset | Length | Disk | Offset | Length |
| A | 10 | 100 | C | 500 | 100 |
| A | 200 | 100 | D | 1000 | 100 |
| B | 300 | 100 | C | 600 | 100 |
| A | 300 | 100 | D | 1100 | 100 |
| B | 400 | 100 | C | 700 | 100 |
| A | 400 | 100 | D | 1200 | 100 |
| B | 500 | 100 | C | 800 | 100 |
| A | 500 | 100 | D | 1300 | 100 |
| B | 600 | 100 | C | 900 | 100 |
| A | 600 | 100 | D | 1400 | 100 |
| B | 700 | 100 | C | 1000 | 100 |
| A | 700 | 100 | D | 1500 | 100 |
| B | 800 | 100 | C | 9000 | 100 |

The present invention allows this same restore to be specified with 4 instructions. This is accomplished by using ordered pairs. The four ordered pairs are as shown in Table V below:

TABLE V

| Backup Extents | | | Restore Extents | | |
|---|---|---|---|---|---|
| Disk | Offset | Length | Disk | Offset | Length |
| [(A, | 10, | 100), | (C | 500 | 100)] |
| [(A, | 200, | 600), | (D, | 1000, | 600)] |
| [(B, | 300, | 500), | (C, | 600, | 500)] |
| [(B, | 800, | 100), | (C, | 9000, | 100)] |

Thus, with only 4 instructions, the same result was accomplished as was accomplished using 13 instructions with the prior art technique.

It should be noted that if each stripe had been 100 blocks instead of 13, then Table IV would have 201 entries (i.e. one would need to specify where to place each of the 201 backup extents. In accordance with the present invention, however, this same restore can again be done with 4 entries.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A method of backing up data used in a computer system having a client, a primary storage system and a backup storage system, the method comprising:
   obtaining one or more actual extents on the primary storage system;
   examining each extent in relation to the other extents to identify a pattern in the actual extents;
   collapsing the extents; and
   specifying the collapsed extents to the backup storage system.

2. The method of claim 1, further comprising receiving a list of all extents from the computer system.

3. The method of claim 1, further comprising:
receiving a layout of logical volumes associated with one or more actual extents and a layout of files within the logical volumes; and
analyzing at least one of the layout of logical volumes and the layout of files to determine one or more patterns in the actual extents.

4. The method of claim 1 further comprising:
generating a representation of files specified by the actual extents that is more compact than the representation provided by the actual extents and defining the representation as a collapsed extent.

5. The method of claim 4, further comprising recording information relating to the extents that make up the collapsed extent.

6. The method of claim 1, further comprising recognizing whether or not the pattern is a stripe pattern.

7. The method of claim 6 further comprising recording, if the pattern is a stripe pattern, the manner in which the data was striped.

8. A method of backing up data used in a computer system having a client, a primary storage system and a backup storage system, the method comprising:
obtaining one or more actual extents on the primary storage system, the obtaining comprising:
obtaining a layout of the logical volumes of the computer system;
determining the types of logical volumes from the layout; and
obtaining a layout of the files within the logical volumes;
identifying a pattern in the actual extents based on at least one of the types of logical volumes and the layout of the files within the logical volumes;
determining one or more actual extents on the primary storage system;
collapsing the extents; and
specifying the collapsed extents to the backup storage system.

9. The method of claim 8 further comprising:
generating a representation of files specified by the actual extents that is more compact than the representation provided by the actual extents and defining the representation as a collapsed extent.

10. The method of claim 8, further comprising recording information relating to the extents that make up the collapsed extent.

11. The method of claim 8, further comprising recognizing whether or not the pattern is a stripe pattern.

12. The method of claim 8 further comprising recording, if the pattern is a stripe pattern, the manner in which the data was striped.

13. A method of restoring data from a backup and restore system to a host, the method comprising:
(a) creating empty objects on host to restore into;
(b) discovering the extents of the empty objects;
(c) reading the extents of the backup objects; and
(d) specifying a mapping from backup extents to restore extents wherein at least one of the extents coiresponds to a collapsed extent;
wherein specifying a mapping comprises:
(d-a) identifying whether both back up and restore extents are striped;
(d-b) in response to both the back up and restore extents being striped, identifying whether both back up and restore extents have the same column width and column count;
(d-c) in response to both the back up and restore extents being striped, identifying whether both back up and restore extents start at the beginning of a stripe element;
(d-d) computing a number of repetitions; and
(d-e) generating a single restore extent for the number of repetitions;
wherein, if both backup and restore extents are striped and start at the beginning of a stripe element, repeating step (d-e) for each stripe in the extent.

14. The method of claim 13, further comprising repeating steps (d-a) through (d-e) for each extent.

15. The method of claim 13, wherein, if both the back up and restore extents are not striped, or if both back up and restore extents do not have the same column width and column count, or if both back up and restore extents do not start at the beginning of a stripe element, creating a back up and restore extent for one block on the backup and restore system.

* * * * *